H. KEMPINSKI.
EXHIBITING SHOW FOR WINDOW DECORATION AND SIMILAR PURPOSES.
APPLICATION FILED OCT. 6, 1910.
996,929.
Patented July 4, 1911.
2 SHEETS—SHEET 1.
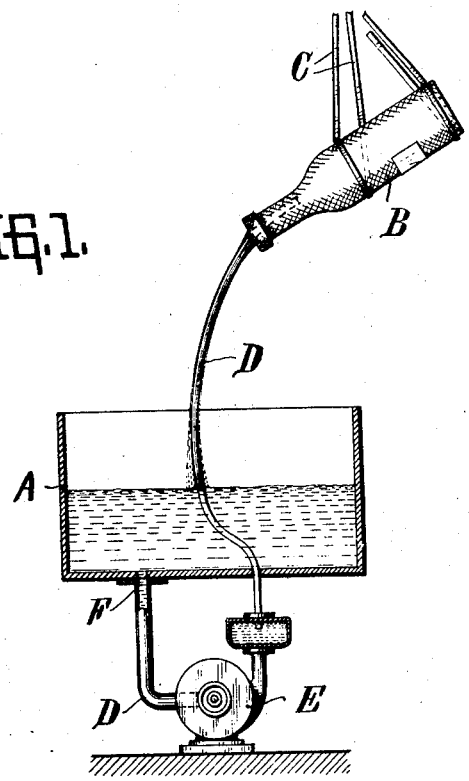
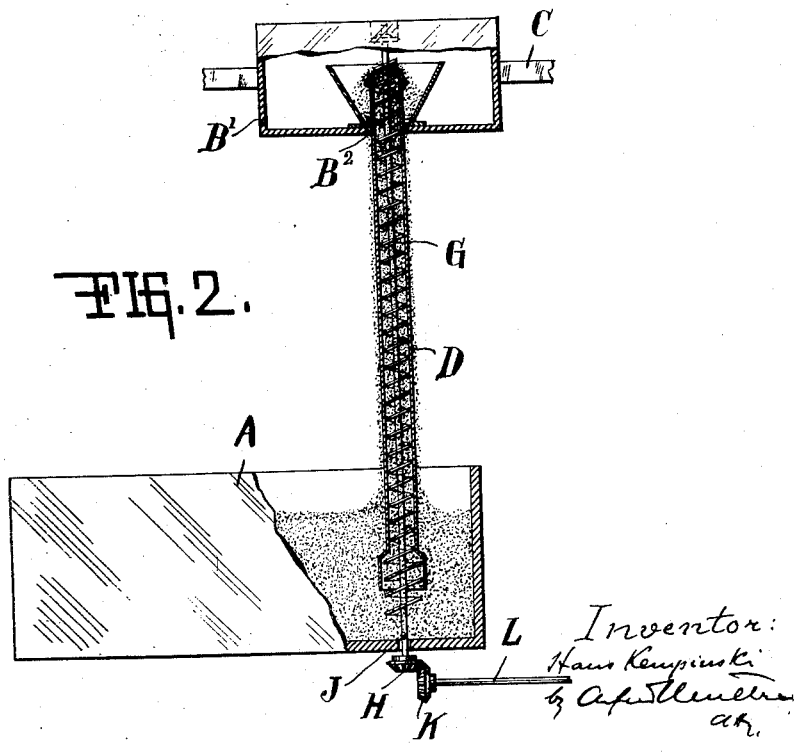
Witnesses:
Inventor:
Hans Kempinski H. KEMPINSKI.
EXHIBITING SHOW FOR WINDOW DECORATION AND SIMILAR PURPOSES.
APPLICATION FILED OCT. 6, 1910.
996,929.
Patented July 4, 1911.
2 SHEETS—SHEET 2.
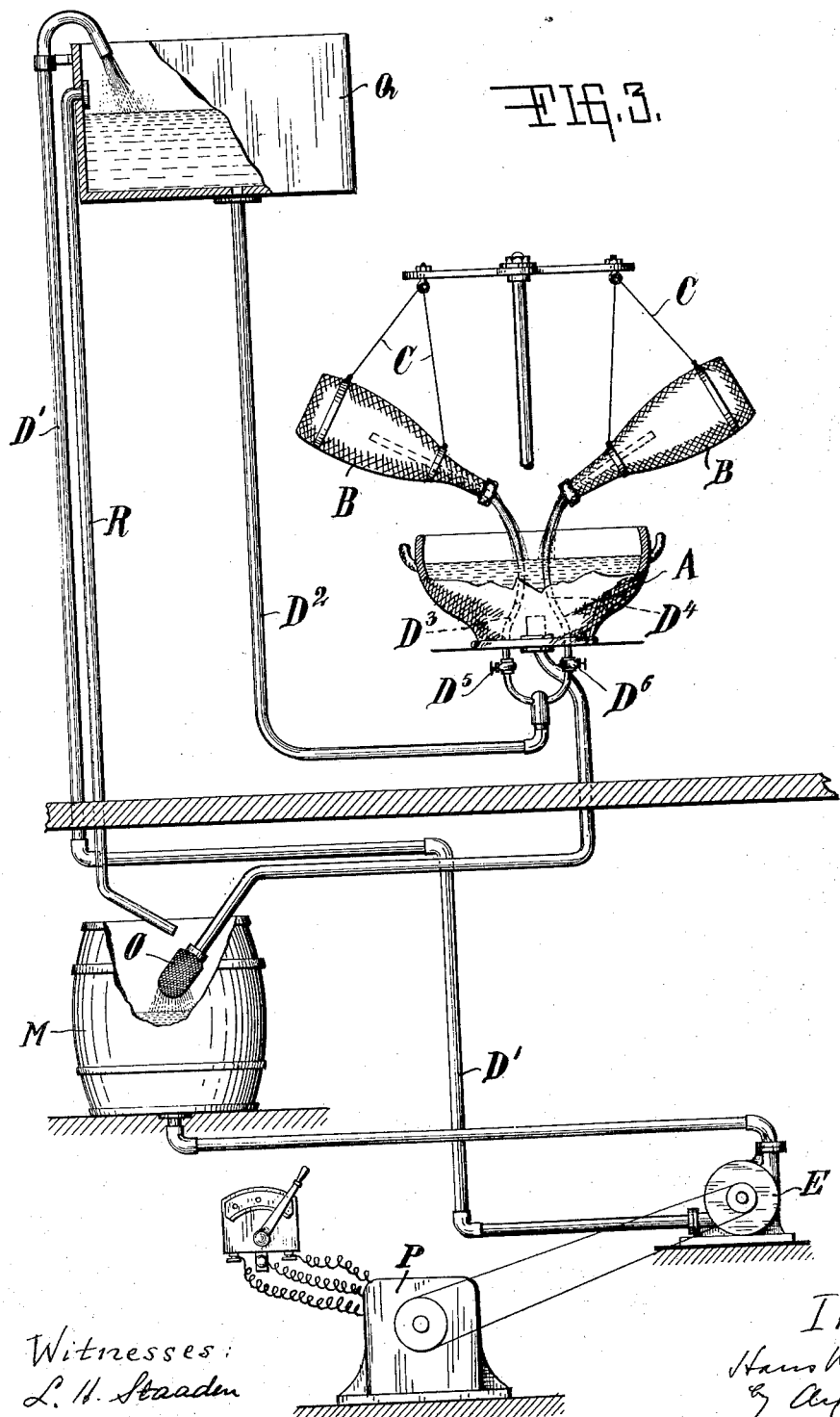

UNITED STATES PATENT OFFICE.

HANS KEMPINSKI, OF BERLIN, GERMANY, ASSIGNOR TO CHARLES W. SAALBURG, OF NEW YORK, N. Y.

EXHIBITING-SHOW FOR WINDOW-DECORATION AND SIMILAR PURPOSES.

996,929.

Specification of Letters Patent. Patented July 4, 1911.

Application filed October 6, 1910. Serial No. 585,573.

*To all whom it may concern:*

Be it known that I, HANS KEMPINSKI, a subject of the King of Prussia, residing at Berlin, in the Kingdom of Prussia and German Empire, have invented a new and useful Improvement in Exhibiting-Shows for Window-Decoration and Similar Purposes, of which the following is a specification.

My invention relates to that class of exhibiting shows which may be arranged in the windows of business places, in exhibition halls or like places to attract the attention of the persons on the street.

My invention comprises a bottle suspended or placed with the mouth downward to allow its contents to flow out, a receptacle or vessel of any kind located below said bottle to receive the liquid pouring out from the bottle, and a conduit forming a passage from the said receptacle to the said bottle and being connected to a driving means such as a pump or the like, to force the liquid back from the receptacle into the bottle to pour out therefrom in a continuous current without any interruption as long as the said driving means is in operation. It is essential that the said conduit be so located and arranged as to be embedded in the stream of liquid flowing down from the bottle and consequently to be invisible to the spectators. A very surprising and wonderful effect is thereby attained.

Instead of a bottle I can of course use a vessel of any other kind or shape and instead of a liquid, such as wine, soda-water, beer, coffee or the like, I can also employ a solid substance such as powdered sugar, flour or the like without thereby departing from the gist of my invention.

My invention also comprises all the particular constructions and arrangements necessary to carry out the above described idea or principle, which I will now proceed to describe with reference to the drawings, which are of more or less diagrammatic nature and in which—

Figure 1 is an elevation, partly in section, of an arrangement constructed in accordance with my invention to show a continual current of a liquor, say red wine. Fig. 2 is a similar view of an arrangement constructed in accordance with my invention to show a continuous current of a pulverous substance, say powdered sugar. Fig. 3 is a general view of a similar arrangement as shown in Fig. 1 with some accessory devices.

In the drawings A represents the receptacle for receiving the liquid flowing out from the bottle B, Fig. 1, or the powder dropping in a continual stream from the vessel B', Fig. 2. The bottle may be suspended by strings C and the vessel B' may be supported by brackets C', or in any other suitable manner. The receptacle A is carried by a table or the like, not shown. The liquid in Fig. 1 or the powder in Fig. 2 is forced back into the bottle or vessel respectively by the aid of a pipe D the upper end of which terminates in the mouth of the bottle B or vessel B' and the lower end below or in the receptacle A. According to Fig. 1 the pipe D passes through the bottom of the receptacle A to a pump E and from there back to the bottom of the receptacle at F to conduct the liquid flowing into the receptacle down to the pump E. The latter is operated by any suitable source of power to force the liquid up back into the bottle B, so that a continuous circuit is established thereby in which the liquid flows first from the bottle into the receptacle and then from the latter back to the bottle by way of the conduit D and pump E. The upper portion of the conduit D is preferably made of glass of the same color as that of the liquid and is so curved as to correspond with the curve of the pouring liquid. Consequently the glass is thoroughly hidden and concealed in the liquid which flows from the bottle and the sight of the liquid pouring out incessantly from the bottle affords a great attraction, as the return of the liquid to the bottle cannot be seen.

In the modification shown in Fig. 2 the powdered substance, say sugar, flowing through the outlet B² in the bottom of the vessel B', is likewise returned to the latter by way of the pipe D and a feeding screw G arranged therein. In this case the pipe is colored white on the outside to correspond to the color of the sugar which flows out in a broad stream around the pipe thereby concealing latter from the spectator. The feed screw G is driven by means of a beveled gear H integral with or fast on the axis J of the feed screw and being in mesh with a beveled pinion K keyed on a driven shaft L. In lieu of a toothed gear a friction gear may be used.

In the modification shown in Fig. 3 two bottles B are suspended above the receptacle A and a filtering device M and a speed or pressure regulating device Q are inserted in the conduit D. The filtering device consists of a tub or a vessel of any suitable shape, into which the liquid flows direct from the receptacle A by means of the conduit D, having a filtering bag O attached to its free end so that the liquid is filtered and freed from all impurities and is in a pure and clear condition when subsequently passing through the pump E. The latter is driven by a small electric motor P and a belt drive. The liquid is forced by the pump through the conduit D' into a reservoir Q arranged at a certain height above the vessel A. From the reservoir Q the liquid flows down through the conduit $D^2$ from which it is forced through the branches $D^3$ $D^4$ into the bottles B. Each of said branches $D^3$ $D^4$ is provided with a regulating valve $D^5$ $D^6$ respectively.

To obtain a constantly uniform current from the bottles B the power or force of the pump is a little in excess of the capacity of the conduit $D^2$, and an overflow pipe R is provided in connection with the reservoir Q to maintain therein a normal level by returning the surplus liquid in Q to the vessel M.

I claim—

In an exhibition device, the combination of a container for fluids, having a neck, or spout, said neck or spout being in an inclined position, a tube entering said neck or spout, and means for forcing fluid through said tube into said container, said tube being bent to conform to the trajectory formed by the liquid as it flows out of said neck, or spout, whereby said tube may be concealed in the stream of falling liquid.

In testimony whereof I have signed my name to this specification in the presence of two subscribing witnesses.

HANS KEMPINSKI.

Witnesses:
BERNHARD GRAETZ,
RICHARD KINDLER.